(12) United States Patent
Razin

(10) Patent No.: US 11,468,367 B2
(45) Date of Patent: Oct. 11, 2022

(54) METHOD AND APPARATUS FOR COGNITIVE SYSTEM TRAINING WITH INCORPORATION OF PROBABILITY AND UNCERTAINTY TO ACHIEVE DETERMINISTIC RESULTS

(71) Applicant: SWAMPFOX TECHNOLOGIES, INC., Columbia, SC (US)

(72) Inventor: Sergey A. Razin, Columbia, SC (US)

(73) Assignee: Swampfox Technologies, Inc., Columbia, SC (US)

( * ) Notice: Subject to any disclaimer, the term of this patent is extended or adjusted under 35 U.S.C. 154(b) by 484 days.

(21) Appl. No.: 16/783,641

(22) Filed: Feb. 6, 2020

(65) Prior Publication Data
US 2020/0250581 A1 Aug. 6, 2020

Related U.S. Application Data

(60) Provisional application No. 62/801,943, filed on Feb. 6, 2019.

(51) Int. Cl.
*G06N 5/04* (2006.01)
*G06N 20/00* (2019.01)

(52) U.S. Cl.
CPC ............. *G06N 20/00* (2019.01); *G06N 5/04* (2013.01)

(58) Field of Classification Search
CPC ...................................................... G06N 5/04
See application file for complete search history.

(56) References Cited

U.S. PATENT DOCUMENTS 11,394,552 B2 * 7/2022 Streit .................. G06N 3/04
2020/0014541 A1 * 1/2020 Streit .................. G06F 21/6245

* cited by examiner

*Primary Examiner* — Brian Whipple
(74) *Attorney, Agent, or Firm* — Duquette Law Group

(57) ABSTRACT

A method of training a cognitive system comprises identifying, by a cognitive training device, a performance specification associated with a cognitive device; determining, by the cognitive training device, a forecasted number of communication inputs to be received by the cognitive device to meet the performance specification; identifying, by the cognitive training device, each communication input received by the cognitive device; and when the number of communication inputs reaches the forecasted number of communication inputs, automating, by the cognitive training device, identification of intents associated with additional communication inputs received by the cognitive device. Additionally, the cognitive training device can include a statistical model employed to determine the random sampling method of the experts utilized during training of the cognitive system in order to classify the gathered input into appropriate intents while mitigating incorporation of bias.

20 Claims, 7 Drawing Sheets

| Percentage Confidence | z*-Value |
|---|---|
| 80 | 1.28 |
| 90 | 1.645 |
| 95 | 1.96 |
| 98 | 2.33 |
| 99 | 2.58 |

350

| Population Size | Confidence = 95% Margin of Error | | | | Confidence = 99% Margin of Error | | | |
|---|---|---|---|---|---|---|---|---|
| | 5.0% | 3.5% | 2.5% | 1.0% | 5.0% | 3.5% | 2.5% | 1.0% |
| 10 | 10 | 10 | 10 | 10 | 10 | 10 | 10 | 10 |
| 20 | 19 | 20 | 20 | 20 | 19 | 20 | 20 | 20 |
| 30 | 28 | 29 | 29 | 30 | 29 | 29 | 30 | 30 |
| 50 | 44 | 47 | 48 | 50 | 47 | 48 | 49 | 50 |
| 75 | 63 | 69 | 72 | 74 | 67 | 71 | 73 | 75 |
| 100 | 80 | 89 | 94 | 99 | 87 | 93 | 96 | 99 |
| 150 | 108 | 126 | 137 | 148 | 122 | 135 | 142 | 149 |
| 200 | 132 | 160 | 177 | 196 | 154 | 174 | 186 | 198 |
| 250 | 152 | 190 | 215 | 244 | 182 | 211 | 229 | 246 |
| 300 | 169 | 217 | 251 | 291 | 207 | 246 | 270 | 295 |
| 400 | 196 | 265 | 318 | 384 | 250 | 309 | 348 | 391 |
| 500 | 217 | 306 | 377 | 475 | 265 | 365 | 421 | 485 |
| 600 | 234 | 340 | 432 | 565 | 315 | 416 | 490 | 579 |
| 700 | 246 | 370 | 481 | 653 | 341 | 462 | 554 | 672 |
| 800 | 260 | 526 | 481 | 739 | 363 | 503 | 615 | 763 |
| 1,000 | 278 | 440 | 606 | 906 | 399 | 575 | 727 | 943 |
| 1,200 | 291 | 474 | 674 | 1067 | 427 | 636 | 827 | 1119 |
| 1,500 | 306 | 515 | 759 | 1297 | 460 | 712 | 959 | 1376 |
| 2,000 | 322 | 563 | 869 | 1655 | 498 | 808 | 1141 | 1785 |
| 2,500 | 333 | 597 | 952 | 1984 | 524 | 879 | 1288 | 2173 |
| 3,500 | 346 | 641 | 1068 | 2565 | 558 | 977 | 1510 | 2890 |
| 5,000 | 357 | 678 | 1176 | 3268 | 586 | 1066 | 1734 | 3842 |
| 7,500 | 365 | 710 | 1275 | 4211 | 610 | 1147 | 1960 | 5165 |
| 10,000 | 370 | 727 | 1332 | 4899 | 622 | 1193 | 2098 | 6293 |
| 25,000 | 378 | 760 | 1448 | 6939 | 646 | 1285 | 2399 | 9972 |
| 50,000 | 381 | 772 | 1491 | 8056 | 655 | 1318 | 2520 | 12455 |
| 75,000 | 382 | 776 | 1506 | 8514 | 658 | 1330 | 2563 | 13583 |
| 100,000 | 383 | 778 | 1513 | 8762 | 659 | 1336 | 2585 | 14227 |
| 250,000 | 384 | 782 | 1527 | 9248 | 662 | 1347 | 2626 | 15555 |
| 500,000 | 384 | 783 | 1532 | 9423 | 663 | 1350 | 2640 | 16055 |
| 1,000,000 | 384 | 783 | 1534 | 9512 | 663 | 1352 | 2647 | 16317 |
| 2,500,000 | 384 | 784 | 1536 | 9567 | 663 | 1353 | 2651 | 16478 |
| 10,000,000 | 384 | 784 | 1536 | 9564 | 663 | 1354 | 2653 | 16560 |
| 100,000,000 | 384 | 784 | 1537 | 9603 | 663 | 1354 | 2654 | 16584 |
| 300,000,000 | 384 | 784 | 1537 | 9603 | 663 | 1354 | 2654 | 16586 |

FIG. 6

METHOD AND APPARATUS FOR COGNITIVE SYSTEM TRAINING WITH INCORPORATION OF PROBABILITY AND UNCERTAINTY TO ACHIEVE DETERMINISTIC RESULTS

RELATED APPLICATIONS

This patent application claims the benefit of U.S. Provisional Application No. 62/801,943, filed on Feb. 6, 2019, entitled, "Method and Apparatus For Cognitive System Training with Incorporation of Probability and Uncertainty to Achieve Deterministic Results," the contents and teachings of which are hereby incorporated by reference in their entirety.

BACKGROUND

Enterprises typically utilize interactive systems to receive and distribute incoming customer communications, such as calls, within an organization. Conventional interactive systems can include interactive voice, chat or email systems that can automate user access to the enterprise. For example, conventional interactive systems can provide access, such as phone-based access or access via other channels of communication, to an information resource associated with the enterprise, such as an email system or database. Conventional interactive systems can also route a user to a particular human resource within the enterprise, such as a person in customer service.

In order to direct an incoming caller to an appropriate destination, conventional interactive systems may include one or more Automated Speech Recognition (ASR) systems. Typically, ASR systems can recognize single-word commands from the caller, such as yes-or-no responses and/or spoken numerals. This allows the caller to advance through automated menus toward a destination within the organization without requiring the caller to enter the responses manually.

Further, conventional interactive systems can utilize cognitive engines which are based on Natural Language Understanding (NLU) powered technology. Typical NLUs involve a neural network foundation with either deep networks (also known as Deep Learning) or shallow networks (typical neural networks). Cognitive engines can identify incoming customer communications, collaborate with the communications on any available channel (e.g., voice, chat, short message service (SMS), etc.), and can emulate human responses in order to perform tasks on behalf of the enterprise, such as related to customer service.

SUMMARY

Conventional interactive systems can suffer from a variety of deficiencies. For example, conventional interactive systems typically utilize statically-defined phrases or strings in order to identify the intent of the caller/user. For example, each of the different phrases "yes," "OK," and "all right," can identify, as the intent, a user's agreement to a given query. Accordingly, in order to have a caller directed towards a particular department within the enterprise, the interactive system must be initially configured with these statically-defined phrases to identify that each of the phrases "yes," "OK," and "all right," relates to the same intent. However, if the user deviates or varies his response from the preset, statically-defined phrases during operation, the interactive system will be unable to identify the response, thus leading to failure of the system during a response recognition process. Therefore, the conventional approach of storing statically-defined phrases can be problematic and does not provide a human caller/user to interact with the interactive system and express his intent in a relatively natural manner.

The use of conventional cognitive engines can also suffer from a variety of deficiencies. For example, in order to direct users to the appropriate destinations within an organization, conventional cognitive engines can be trained to identify a particular intent associated with an incoming communication (e.g., voice, chat, SMS, email, etc.). Intent can be defined as a high-level description of an operation to be performed, such as requested by a user in an incoming communication. For example, with the phrase "please close the door," the intent associated with the phrase is "close the door" as it relates to the operation requested by the user. By understanding the intent of an incoming communication, the cognitive engine can connect the user with a particular receiving person or department destination within the enterprise. Cognitive engines can therefore provide customers with the ability to more naturally interact with brands and companies, which can provide the user with a relatively better user experience.

To train the cognitive engine, the enterprise can utilize a number of workers to manually review each incoming communication and to assign a particular intent to the phrase(s) within each communication. However, there is typically no feedback provided by the cognitive engine relating to its training. Therefore, a determination of the adequacy of the training can be subjective. As such, the cognitive engine may be under trained, which can result in the cognitive engines operating below a desired level of operability. Alternately, the workers may over train the cognitive engine, such as over a relatively long time duration, which can be relatively costly in terms of man hours utilized.

By contrast to conventional call systems, embodiments of the present innovation relate to a method and apparatus for cognitive system training with incorporation of probability and uncertainty to achieve deterministic results. A cognitive system provides the ability for a human/user to naturally interact with an enterprise and is able to derive the intent from the interaction. To provide the interaction in an automated or non-monitored manned, the cognitive system can be configured to receive training regarding the intent associated with user communication inputs. In one arrangement, the cognitive device can receive training based upon a statistical method executed by a cognitive training device relative to a preset performance specification level to identify the population of inputs needed to fulfill the performance specification associated with the system. Once the cognitive device has received a sufficient number of inputs, the cognitive training device can allow automation of the operation of the cognitive device with minimal, if any, additional training.

Additionally, the cognitive training device can be configured to derive an optimal number of expert operators who can classify the phrases associated with communication inputs and derive the intents in order to mitigate potential bias. For example, the cognitive training device can utilize a statistical model to determine the random sampling method of the experts utilized during training of the cognitive system. Accordingly, the cognitive training can derive a deterministic number of expert operators to be involved in the training process. This deterministic number of expert operators can effectively classify the communication inputs received by the cognitive system while minimizing bias.

In one arrangement, embodiments of the innovation relate to a method of training a cognitive system. The method comprises identifying, by a cognitive training device, a performance specification associated with a cognitive device; determining, by the cognitive training device, a forecasted number of communication inputs to be received by the cognitive device to meet the performance specification; identifying, by the cognitive training device, each communication input received by the cognitive device; and when the number of communication inputs reaches the forecasted number of communication inputs, automating, by the cognitive training device, identification of intents associated with additional communication inputs received by the cognitive device. Additionally, the cognitive training device can include a statistical model employed to determine the random sampling method of the experts utilized during training of the cognitive system in order to classify the gathered input into appropriate intents while mitigating incorporation of bias.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 6 illustrates a table showing values used by a cognitive training device training method/system when identifying an optimal number of cognitive system workers to be used to capture incoming communication inputs, according to one arrangement.

DETAILED DESCRIPTION

Embodiments of the present innovation relate to a method and apparatus for cognitive system training with incorporation of probability and uncertainty to achieve deterministic results. A cognitive device of the system provides the ability for a human/user to naturally interact with an enterprise and is able to derive an intent from the interaction. Accordingly, the cognitive device is configured to receive training regarding the intent associated with communication inputs received from the user. In one arrangement, the cognitive device can receive training based upon a statistical method executed by a cognitive training device relative to a preset performance specification level to identify the population of inputs needed to fulfill the performance specification associated with the system. Once the cognitive device has received a sufficient number of inputs, the cognitive training device can allow automation of the operation of the cognitive device with minimal, if any, additional training.

Additionally, the cognitive training device can be configured to derive an optimal number of experts who can classify the phrases associated with communication inputs and derive the intents in order to mitigate potential bias. For example, the cognitive training device can utilize a statistical model to determine the random sampling method of the experts utilized during training of the cognitive system. Accordingly, the cognitive training can derive a deterministic number of experts to be involved in the training process in order to effectively classify the communication inputs while minimizing bias.

Figure 1:
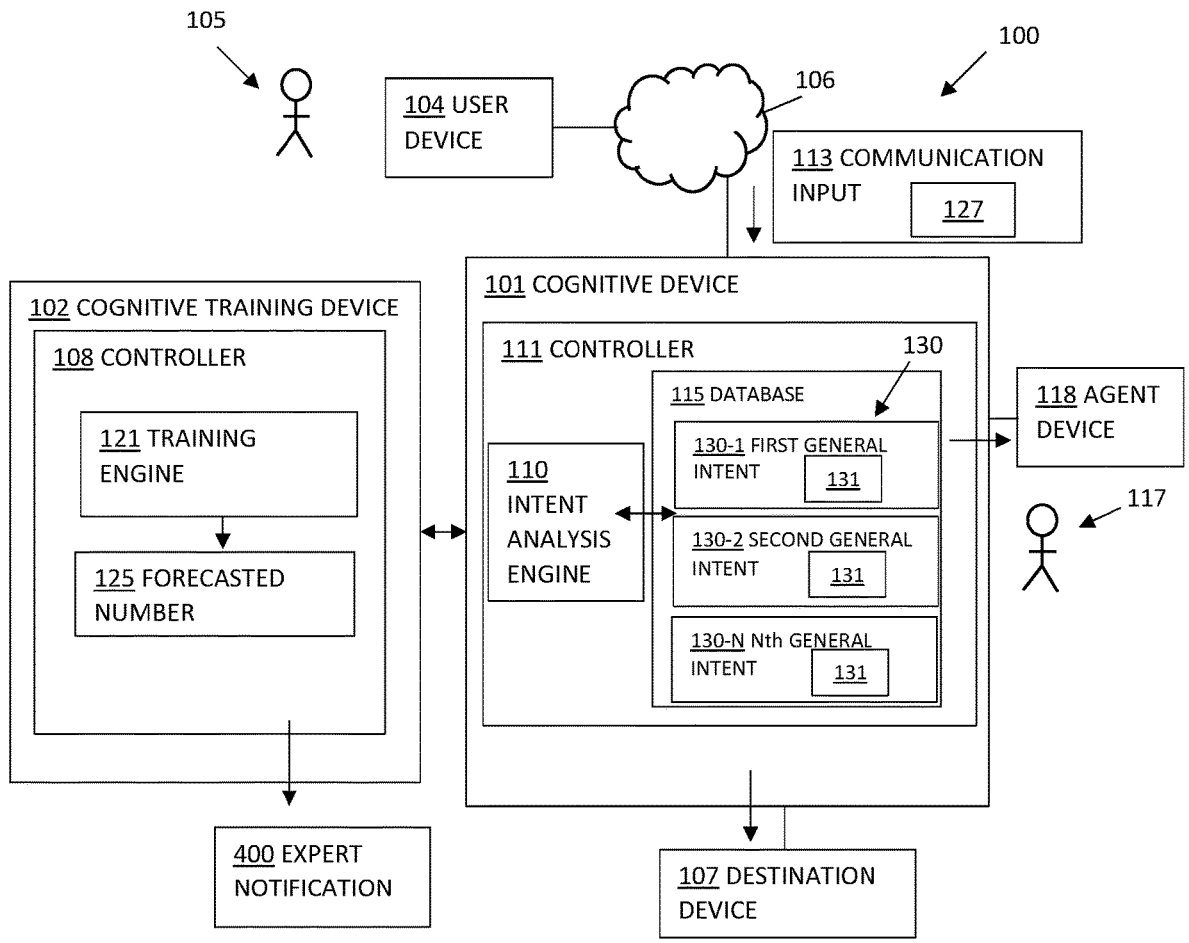
FIG. 1 illustrates schematic representation of an example cognitive system, according to one arrangement.

FIG. 1 illustrates a cognitive system 100 which is configured to identify incoming customer communications on behalf of an enterprise. According to one arrangement, the cognitive system 100 includes at least one cognitive device 101 disposed in electrical communication with a user device 104, such as a telephone, smartphone, or tablet device, via network 106, such as a local area network (LAN), a wide area network (WAN), or a public switched telephone network (PSTN). The cognitive system 100 also includes a cognitive training device 102, having a controller 108 such as a memory and a processor, disposed in electrical communication with the cognitive device 101.

The cognitive device 101 is configured to direct a user 105 of the user device 104, such as a customer, to an appropriate department or destination device 107 within the organization based upon the intent of one or more communication inputs 113, such as calls, voice commands, or text commands (e.g., chat, SMS, etc.), received from the user 105. In one arrangement, the cognitive device 101 includes a controller 111, such as a memory and a processor configured to execute a cognitive engine, such as an intent analysis engine 110. During operation, the intent analysis engine 110 can be configured to identify a particular intent associated with the communication input 113. As a result of the identification, the intent cognitive device 101 can direct the user 105 to a particular destination device 107, such as a particular destination within the organization, based upon the identified intent. In the case where the intent analysis engine 110 fails to identify a particular intent associated with a communication input 113, the cognitive device 101 can direct the user 105 to an agent device 118, such as a computerized device, associated with the enterprise that can be operated by an agent 117. The agent 117 can then assist the user 105 by identifying the appropriate destination device 107, such as associated with a particular department within the enterprise.

In one arrangement, the destination device 107 is configured as a computerized device, such as a laptop computer or tablet device. In one arrangement, the destination device 107 can be configured as another cognitive system that is capable to perform certain tasks that are specific to the intent associated with the communication input 113.

When an enterprise initially launches the cognitive system 100, the cognitive device 101 can include a database 115 preconfigured with a variety of categories of general intents 130, which are identifiable by the cognitive device 101. For example, the database 115 can include "affirmative response" as a first general intent 130-1 and "negative response" as a second general intent 130-2 that are identifiable by the cognitive device 101. It should be understood, that the database 115 can be configured with any number of general intents 130, as indicated by the $n^{th}$ general intent 130–N.

At the time of the launch of the cognitive system 100, there can be a number of specific phrases which have the same intent as the general intents 130 but which are not specifically included in the database 115. For example, when the enterprise initially launches the cognitive system 100, phrases such as "yes," "OK," "yeah," "yep," and "all right," can be considered to have the same intent as the first general intent 130-1, "affirmative response," but which may not initially be included within the database 115 or classified as falling under the category of the first general intent 130-1. As part of the training process, the cognitive device 101 can update the database 115 to associate particular phrases 127 having identified intents, such as provided by communication inputs 113, with a corresponding general intent 130.

As provided above, the general intents 130 included within the database 115 can be a pre-trained set of intents which are conventionally known as "small talk" intents. In one arrangement, the database 115 can also be configured with enterprise industry specific intents that can be derived from a separate training process which utilizes both input from customers as well as categorization from experts. Embodiments of the cognitive training device 102 can be configured to quantify these industry specific intents with the application of a statistical model to both customer/user interactions as well as agent/expert input.

In order to provide autonomous operation of the cognitive system 100 following its launch, the cognitive device 101 can build the database 115 during a training process to associate phrases 127 of incoming communication inputs 113 with a particular general intent 130. However, the duration and number of iterations associated with such training can be subjective. To minimize the effect of this subjectivity, the cognitive training device 102 can be configured to determine a minimum number of user interactions or communication inputs 113 to be received by the cognitive device 101 while building the database 115 during training. For example, as will be described below, the cognitive training device 102 can execute a training engine 121 to incorporate probability and uncertainty into the training process while determining a forecasted number 0 of communication inputs 113, such as user interactions, to be received during training.

Figure 2:
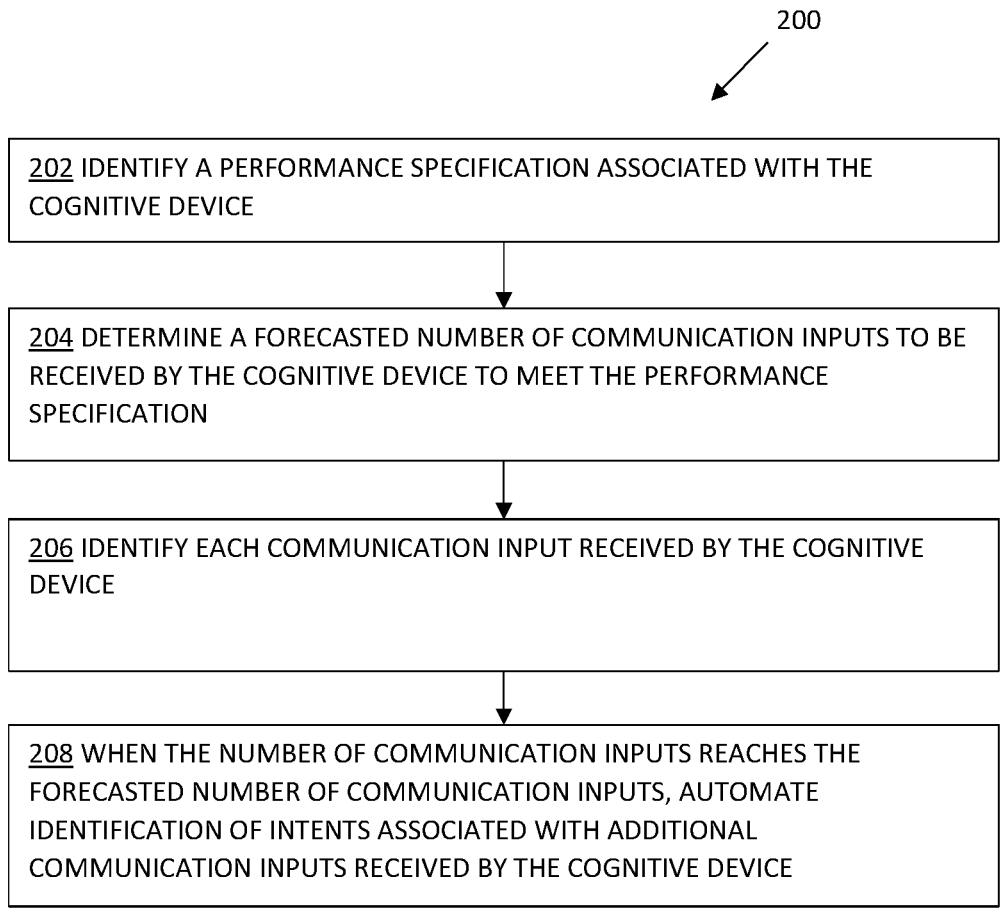
FIG. 2 illustrates a flowchart, according to one arrangement.

FIG. 2 illustrates a flow chart 200 that outlines an example operation of the cognitive training device 102 during a training process.

In element 202, the cognitive training device 102 identifies a performance specification 112 associated with the cognitive device 101, such as stored by the controller 108. The performance specification 112 can be configured to include a variety of metrics associated with the operation of the cognitive device 101.

Figure 3:
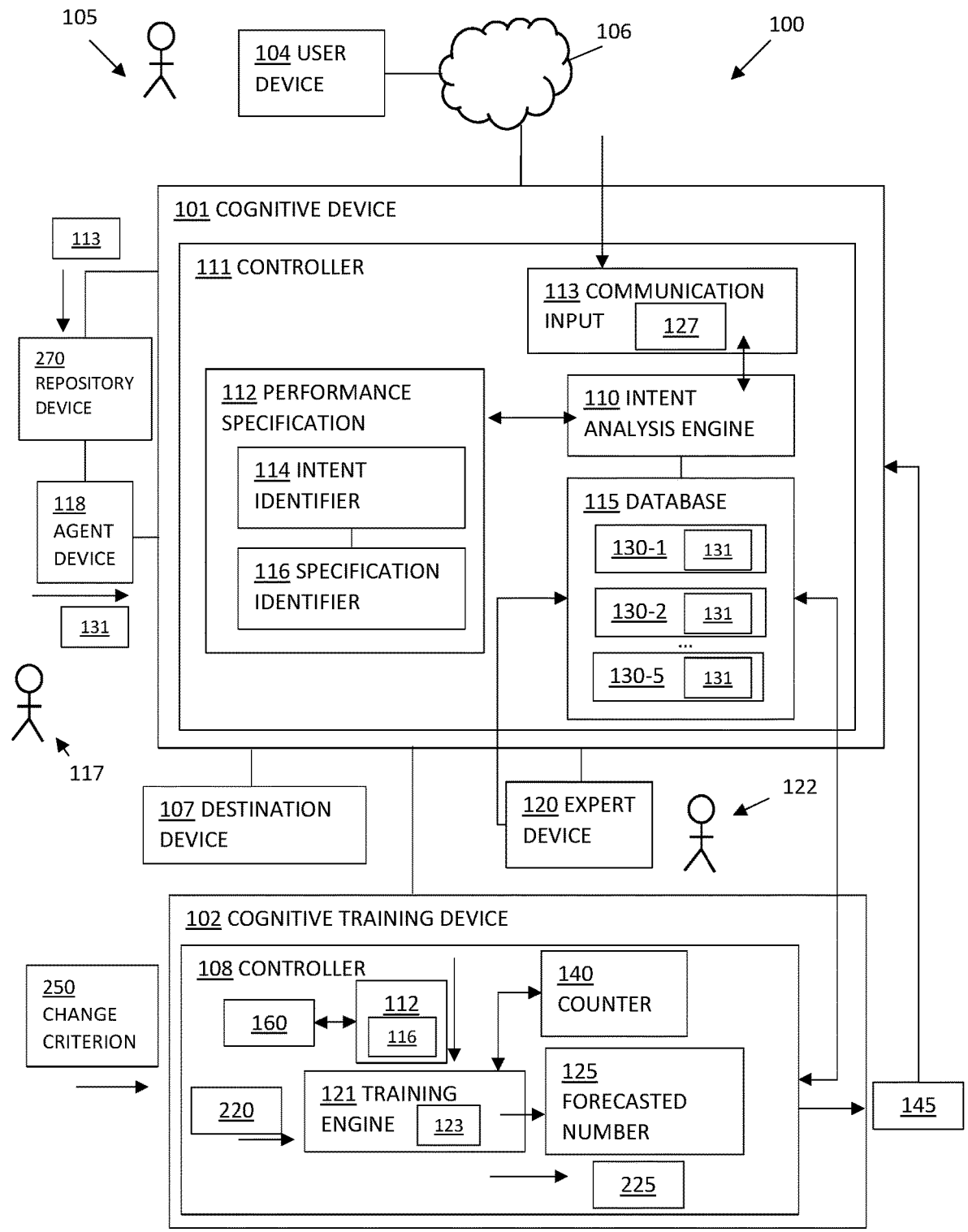
FIG. 3 illustrates a schematic representation of a cognitive device and cognitive training device, according to one arrangement.

In one arrangement, with reference to FIG. 3 the cognitive training device 102 can receive the performance specification 112 from the cognitive device 101. While the performance specification 112 can be configured in a number of ways, the performance specification 112 can include an intent identifier 114 which identifies a given number of general intents 130 that can be recognized by the cognitive device 101. For example, in one case, the cognitive device 101 can be configured to identify "affirmative response," "negative response," "more information request," "repeat previously provided information," and "speak with representative" as five distinct general intents 130. As such, the intent identifier 114 can indicate the number of general intents 130 that can be recognized by the cognitive device 101, in this case five, as well as the description of each of these general intents 130. While the cognitive device 101 can be preconfigured with a particular intent identifier 114 value, such as provided by the enterprise, it should be understood that a systems administrator can adjust or set the intent identifier 114 value, such as based upon the needs or requirements of the cognitive system 100.

In one arrangement, the performance specification 112 can include a specification identifier 116 associated with each intent identifier 114. The specification identifier 116 identifies a given number of unique phrases 129 which are to be associated with each general intent 130 during the training process in order for the cognitive system 100 to be considered trained and to allow further autonomous operation.

Any number of unique phrases can be considered to constitute a similar, or the same, intent for a given general intent 130. For example, each of the different phrases "yes," "OK," "yeah," "yep," and "all right," can identify, as a general intent 130, a user's "affirmative response." As such, the specification identifier 116 can indicate a particular number of individual unique phrases 127 to be identified by the cognitive device 101 from the communication inputs 113 and associated with each general intent 130 in the database 115 as intent phrases 131. It should be understood that the specification identifier 116 can identify any number of unique phrases which constitute a similar, or the same, intent. Further, while the cognitive device 101 can be preconfigured with a particular specification identifier 116 value, it should be understood that a system administrator can adjust or set the specification identifier 116 value, such as based upon the needs or requirements of the cognitive system 100 and/or enterprise.

Returning to FIG. 2, in element 204, the cognitive training device 102 determines a forecasted number 125 of communication inputs 113 to be received by the cognitive device 101 to meet the performance specification 112.

As provided above, the duration and number of iterations associated with such training of the cognitive device 101 can be subjective. To minimize the effect of this subjectivity and to make process more deterministic, the training engine 121 of the cognitive training device 102 can be configured to determine a minimum forecasted number 125 of communication inputs 113 to be received by the cognitive device 101 during training.

In one arrangement, the cognitive training device 102 is configured to utilize a quantile based probability approach to determine a minimum forecasted number 125 of communication inputs 113 to be received during training while building the database 115. In one arrangement, the training engine 121 of the cognitive training device 102 can determine the forecasted number 125 of communication inputs 113 based upon the forecasting relationship 123:

$$E(x) \approx (n \times 3)(ln(n \times 3) + \gamma) + 0.5$$

where
n=intent identifier*specification identifier (i.e., probability); and
$\gamma \approx 0.577216$ (Euler-Mascheroni constant).

For example, assume the case where the intent identifier 114 indicates that the cognitive device 101 can recognize a total of five distinct general intents 130 and the specification identifier 116 indicates that each of the five general intents 130 can have, as a minimum, fifteen distinct intent phrases 131 that embody the intent 130. The training engine 121 can execute the above-referenced relationship E(x) to identify the forecasted number 125 of communication inputs 113 to be received by the cognitive device 101 to meet the operational performance specification 112 of the cognitive device 101. In this case, [E(x)] ((5*15)*3)(1n((5*15)*3)+0.577216)+0.5=1349.

Following the determination of the forecasted number 125 of communication inputs 113, the cognitive device 101 can receive one or more communication inputs 113 from the user device 104. As provided in element 206 of FIG. 2, during this process, the cognitive training device 102 is configured to identify each communication input 113 received by the cognitive device 101.

For example, with reference to FIG. 3, assume the case where the cognitive device 101 receives a first communication input 113 from the user device 104. Upon detection of the receipt of the communication input 113, the training engine 121 of the cognitive training device 102 can increment a counter 140 to track the total number of communication inputs 113 received by the cognitive device 101. The cognitive device 101 can also compare the phrases 127 associated with the communication input 113 with the phrases, if any, stored in the database 115 as part of each general intent 130. For example, assume the case where the communication input 113 includes the phrase 127 "I want to pay my bill." In such a case, the cognitive device 101 can compare at least a portion of the phrase 127 with each intent phrase 131 for each general intent 130 in the database 115. In the case where the cognitive device 101 detects a correspondence between the phrase 127 "I want to pay my bill" of the communication input 113 and an intent phrase 131 "pay bill" in the database 115, the intent analysis engine 110 can identify the intent associated with the communication input 113. With the intent of the communication input 113 identified, the cognitive device 101 can forward the user 105 to the appropriate destination device 107, such as located in a bill payment department of an enterprise, based upon the identified intent. With such a configuration, the cognitive device 101 can both identify and address the intent associated with the communication input 113 in an autonomous manner.

In the case where the cognitive device 101 detects a lack of correspondence between the phrase 127 associated with the communication input 113 and a phrase 131 in the database 115, the cognitive device 101 is configured to direct the user 105 to a person or agent 117 operating an agent device 118 associated with the enterprise. The agent 117 can then provide real-time feedback to the user 105 through the cognitive system 100 based upon the communication input 113 and/or can assist the user 105 by identifying the appropriate destination device 107 or department within the enterprise. Based upon the interaction with the user 105, the agent 117 can forward the user 105 to that destination device 107 and/or department.

Further, in the case where the cognitive device 101 detects a lack of correspondence between the phrase 127 associated with the communication input 113 and any intent phrase 131 appearing in the database 115, the cognitive device 101 can forward the communication input 113 to an expert device 120 to assist in training the database 115 of the cognitive device 101.

Figure 4:
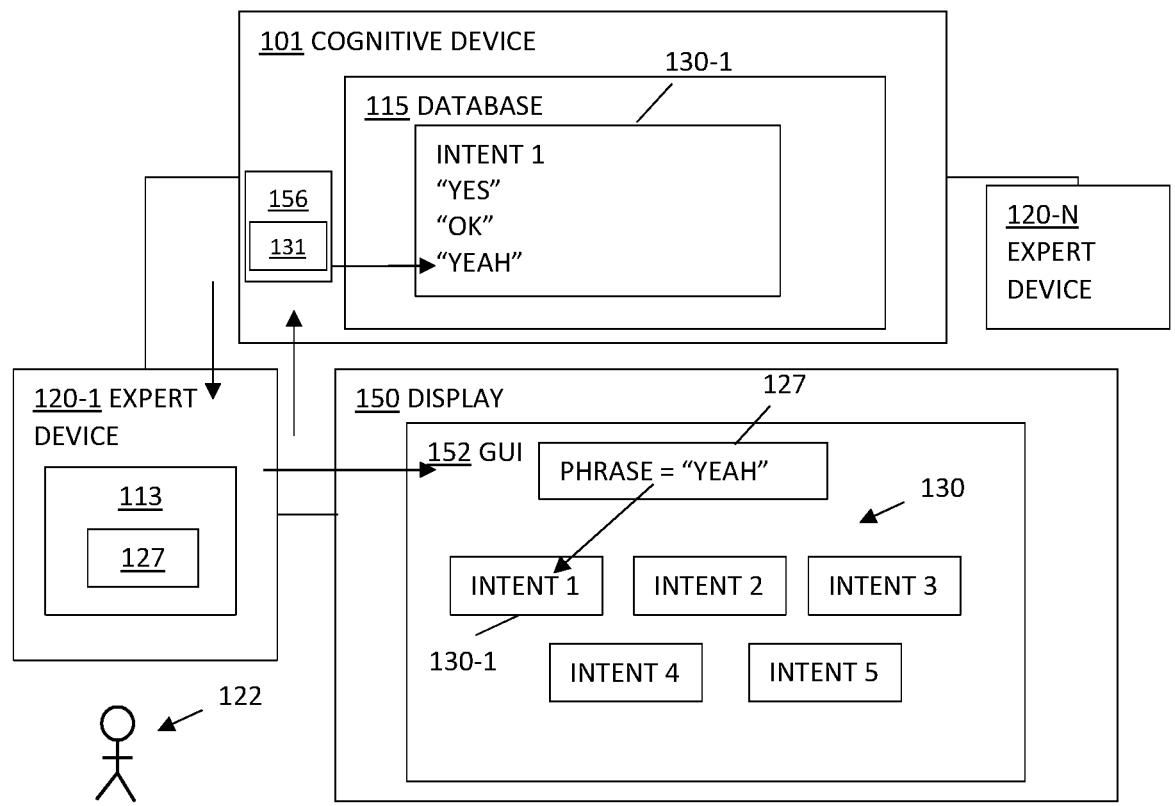
FIG. 4 illustrates a schematic representation of an expert device of the cognitive system, according to one arrangement.

For example, with reference to FIG. 4, the cognitive device 101 can be disposed in electrical communication with one or more expert devices 120-1 through 120-N, such as via a LAN or WAN. Each expert device 120, such as a computerized device having a controller (e.g., a processor and a memory) is operated by an associated expert 122. During a database training process, as the expert device 120 receives a communication input 113 from the cognitive device 101, the expert device 120 allows the expert 122 to review the phrase 127 associated with the communication input and to classify the intent of the phrase 127. Following classification, the expert 122 can assign the associated intent phrase 131 to a particular general intent 130, as defined by the specification identifier 116.

For example, the expert device 120 can include a display 150 which provides a graphical user interface (GUI) 152 to the expert 122. The GUI 152 can display the phrase 127 associated with the communication input 113, as well as the general intents 130 as provided by the specification identifier 116. The expert 122 can examine the phrase 154 and assign the phrase 154 to a particular general intent 130. For example, in the case where the communication input 113 includes the phrase 127 "yeah", based upon a review, the expert 122 can identify the phrase 127 as an "affirmative response," such as covered by the first general intent 130-1, and can cause the expert device 120 to generate an assignment command 156. The assignment command 156 can define a relationship between an intent phrase 131 associated with the phrase 127 and a general intent 130. When the cognitive device 101 receives the assignment command 156, the cognitive device 101 can update the general intent 130 in the database 115 with the intent phrase 131 as identified by the assignment command 156. For example, in the present case, the cognitive device 101 can update the first general intent 130-1, with the intent phrase 131 included with the assignment command 154, in this case the phrase "yeah."

Over time, as the expert 122 identifies the intent of the phrases 127 of additional communication inputs 113 and assigns the phrases 127 to particular categories of general intents 130, the expert 122 can develop or train the database 115.

During operation, as provided above, as the cognitive device 101 receives additional communication inputs 113 from the user device 104, the cognitive training device 102 is further configured to count each communication input 113, such as by incrementing the counter 140. The cognitive training device 102 is also configured to compare a counter value associated with the counter 140 with the forecasted number 125 of communication inputs 113. For example, returning to FIG. 2, in element 208, when the number of communication inputs 113 reaches the forecasted number 125 of communication inputs 113, the cognitive training device 102 is configured to automate identification of intents associated with additional communication inputs 113 received by the cognitive device 101.

In the example provided above, the forecasted number 125 of communication inputs 113 to be received to meet the operational performance specification 112 of the cognitive device 101 is 1349. During the comparison process, once the cognitive training device 102 has identified that the cognitive device 101 has received 1349 forecasted number 125 of communication inputs 113, the cognitive training device 102 identifies the database 115 of the cognitive device 101 as being trained, such that further development of the database 115 is not required. As a result, the cognitive training device 102 can generate and output a notification 145 indicating that the training process for the cognitive device 101 has been completed. In one arrangement, the cognitive training device 102 can forward the notification 145 to the cognitive device 101 to direct the cognitive device 101 to refrain from forwarding additional communication inputs 113, as received from user devices 104, to the expert devices 120.

For example, as a result of receipt of the notification 145, during further operation, for additional communication inputs 113 received by the cognitive device 101 beyond the forecasted number 125, the intent analysis engine 110 can compare the phrases 127 of the communication inputs 113 with the intent phrases 131 stored in the database 115. In the case where the intent analysis engine 110 detects a correspondence between the phrase 127 of the communication input 113 and an intent phrase 131 in the database 115, the intent analysis engine 110 can identify the general intent 130 associated with the phrase 127 and the cognitive device 101 can direct the user 105 to the appropriate destination device 107 within the enterprise based upon the identified intent. In the case where the intent analysis engine 110 detects a lack of correspondence between the phrase 127 associated with the communication input 113 and an intent phrase 131 in the database 115, the cognitive device 101 can direct the user 105 to an agent device 118, such as operated by a person or agent 117, associated with the enterprise. The agent device 118 can then provide real-time feedback to the user 105 through the cognitive system 100 based upon the communication input 113 and/or can assist the user 105 by identifying the appropriate destination device 107 or department within the enterprise and forwarding the user 105 to that destination device 107 and/or department.

With the configuration described above, the cognitive training device 102 minimizes the number of communication inputs 113 required to train the database 115 based upon the concepts of probability and uncertainty. Specifically, once the number of communication inputs 113 meets the forecasted number 125 of communication inputs 113, the database 115 of the cognitive device 101 can be considered to be trained. Further, additional operation of the cognitive device 101 can be automated such that the intent of the communication inputs 113 can be properly determined by the cognitive device 101. For example, with the minimum number of communication inputs 113 having been reached, the cognitive system 100 and the cognitive device 101 can operate in a substantially automated manner with minimal time input needed from the cognitive system experts 122.

As provided above, the enterprise utilizes a number of cognitive system experts (i.e., persons) 122 to assist with the training of the cognitive device 101. While the cognitive system 100 can utilize any number of cognitive system experts 122, the use of relatively two few or too many experts 122 can lead to potential bias during the intent classification process, such as described with respect to FIG. 4. In one arrangement, the cognitive training device 102 is further configured to identify an optimal number of cognitive system experts 122 (e.g., per business function) to be used to review the communication inputs 113 and to identify the intent associated with the communication inputs 113. As such, the experts 122 can train the cognitive device 101 while minimizing possible bias.

For example, in order to optimize the number of cognitive system experts 122 used by the enterprise, the training engine 121 of the cognitive training device 102 can be configured to utilize a random sampling method, such as based on the forecasted worker relationship:

$$\frac{\frac{Z^2 \cdot p(1-p)}{e^2}}{1 + \left(\frac{Z^2 \cdot p(1-p)}{e^2 N}\right)}$$

where:
p=sample portion (assume p=0.5 as a relatively conservative value);
Z=critical value (based on confidence level);
e=margin of error (confidence interval); and
N=population.

Figure 5:
FIG. 5 illustrates a table showing values used by a cognitive training device when identifying an optimal number of cognitive system workers to be used to capture incoming communication inputs, according to one arrangement.

FIG. 5 illustrates an example Table 300 showing the relationship between various margins of error (e) 302 and associated critical values (Z) 304 utilized by the training engine 121 when executing the random sampling relation. FIG. 6 illustrates an example Table 350 showing the relationship between various margins of error (e) 302 and population size (N) 306 utilized by the training engine 121 when executing the random sampling relation.

For example, during operation, assume the case where the training engine 121 of the cognitive training device 102 executes the random sampling relation provided above with p=0.5; Z=1.96 (based upon a 95% confidence interval); e=2.5%; and N=1176 (taken from the table based upon the 2.5% margin of error, the 95% confidence interval, and assuming a population size of 5000). With application of these values to the random sampling relation above, the cognitive training device 102 can determine that 667 cognitive system experts are needed to capture the incoming communication inputs 113 and to train the cognitive system 100 while minimizing possible bias.

As a result of such a determination, at the beginning of the training process, with reference to FIG. 1, the cognitive training device 102 can generate an expert notification 400 which identifies the number of experts 122 to be utilized by the cognitive system 100 during training of the database 115. As a result of the notification 400, the enterprise can assign a sufficient number of experts 122 to a corresponding number of expert devices 120.

As provided above, when the cognitive training device 102 detects the number of communication inputs 113 as reaching the forecasted number 125 of communication inputs 113, the cognitive training device 102 can to automate identification of intents associated with additional communication inputs 113 within the cognitive system 100. However, in certain cases, following receipt of the forecasted number 125 of communication inputs 113, one or more general intents 130 may have fewer assigned intent phrases 131 than established by the specification identifier 116. In such a case, prior to automating the identification of intents associated with additional communication inputs, the cognitive training device 102 can revise the forecasted number 125 of communication inputs 113 and drive the cognitive device 101 to continue to receive additional communication inputs 113 and training of the database 115.

In one arrangement, with reference to FIG. 3, assume the case where the cognitive training device 102 detects that the number of communication inputs identified by the counter 140 reaches the forecasted number 125 of communication inputs 113. As a result, the cognitive training device 102 can be configured to review the database 115 associated with the cognitive device 101 for a number of assigned intent phrases 160 for each general intent 130 and to compare the number of assigned intent phrases 160 for each general intent 130 with the specification identifier 116. Based upon this review, the cognitive training device 102 can retrieve the number of assigned intent phrases 160 for each general intent 130 can compare the number 160 with the specification identifier 116.

For example, assume the case where the database 115 includes a total of five distinct general intents 130-1 through 131-5 where each of the first four general intents 130-1 through 131-4 includes fifteen assigned intent phrases 160 and the fifth general intent 131-5 includes seven assigned intent phrases 160. Further assume the case where the specification identifier 116 indicates that each of the five general intents 130 can have, as a minimum, fifteen assigned intent phrases 160 that embody the intent 130. Based upon a comparison of each of the number assigned intent phrases 160 for each of the general intents 130-1 through 130-5 with the specification identifier 116, the cognitive training device 102 can identify the number of assigned intent phrase 160 of the fifth general intent 130-5 as being less than the specification identifier 116. As such the cognitive training device 102 is configured to adjust a value of the specification identifier 116 of the forecasting relationship 123 and generate a revised forecasted number of communication inputs 225 according to the forecasting relationship 123.

For example, when adjusting value of the specification identifier 116 of the forecasting relationship 123, the cognitive training device 102 can first take a difference between the number of assigned intents identified by the specification identifier 116 and the number of assigned intent phrase 160 of the fifth general intent 130-5 to generate an adjusted specification identifier 220 (i.e., 15-7=8). The cognitive training device 102 can utilize the adjusted specification identifier 220 as part of the forecasting relationship 123, $[E(x)] \approx (n \times 3)(\ln(n \times 3) + \gamma) + 0.5$, to generate the revised forecasted number of communication inputs 225. In this case, substituting n=(8*5) into the forecasting relationship 123 results in $[E(x)] \approx ((5*8)*3)(\ln((5*8)*3) + 0.577216) + 0.5 = 644$ additional communication inputs 113 for the cognitive device 101 to receive.

Following generation of the revised forecasted number of communication inputs 225, the cognitive training device 102 can track the number of communication inputs 113 received by the cognitive device 101, as described above. When the cognitive training device 102 detects that number of communication inputs 113 reaches the revised forecasted number of communication inputs 225, the cognitive training device 102 can continue to repeating the steps of reviewing the database 115 for the number of assigned intent phrases 131 for each general intent 130, comparing the number of assigned intent phrases 113 for each general intent 130 with the specification identifier 116, and deriving additional revised forecasted numbers of communication inputs 225 until the forecast number meets the specification identifier 116. At the point where the forecast number meets the specification identifier 116, the cognitive training device 102 can generate and output a notification 145 indicating that the training process for the cognitive device 101 has been completed.

As provided above, when an enterprise initially launches the cognitive system 100, the cognitive device 101 can include a database 115 preconfigured with a variety of categories of general intents 130, which are identifiable by the cognitive device 101. The cognitive training device 102 is configured to drive the development or training of the database 115 such that each category of general intents includes a number of assigned intent phrases 131 which is at least equal to value identified by a specification identifier 116. However, in certain cases, following the training, an environment related to the cognitive device 101 can change.

For example, assume the cognitive device 101 and its database 115 has been trained for users 105 in the United States. In the case where the enterprise decides to expand its geographic reach to include another country, such as Canada, the enterprise may want to add intent phrases 131 to the database 115 to handle both U.S. callers who speak English and Canadian callers who speak French. Alternately, in the case where the enterprise decides to change its geographic reach entirely, such as from the United States to Europe, the enterprise may want to replace the database 115 to handle callers from Europe, rather than the United States.

In the case where the enterprise makes a change, geographic or otherwise, which can affect the operation of the cognitive device and/or the accuracy of the database 115, with reference to FIG. 3, the enterprise can provide the cognitive training device 102 with a change criterion 250 indicating the presence of a change with the cognitive system 100. In response to receipt of the change criterion 250, the cognitive training device 102 can either append or replace the existing database 115 associated with the cognitive device 101.

For example, assume the case where the change criterion 250 indicates that the existing database 115 is to be appended based upon the exposure of the cognitive device 101 to a new geography. In such a case, the cognitive training device 102 can identify the performance specification 112 associated with the cognitive device 101 and related to the new geography identified by the change criterion 250. The cognitive training device 102 can then determine a forecasted number 125 of communication inputs 113 to be received by the cognitive device 101 to meet the performance specification 112 related to the new geography identified by the change criterion 250. Next, similar to the method provided above, the cognitive training device 102 can identify each communication input 113 received by the cognitive device 101 and an expert 122 at an expert device can add intent phrases 131 to the general intents 130 sored by the database 115 for the new geography. When the number of communication inputs 113 reaches the forecasted number 125 of communication inputs 113 as related to the new geography identified by the change criterion 250, the cognitive training device 102 can automate identification of intents associated with additional communication inputs 113 received by the cognitive device 101.

As provided above, when the cognitive device 101 operates in an automated manner, the cognitive device 101 can receive communication inputs 113 from users 105 and can utilize the database 115 to determine the intent associated with the communication. In the case where the intent analysis engine 110 detects a lack of correspondence between the communication input 113 and an intent phrase 131 in the database 115, the cognitive device 101 can direct the user 105 to an agent device 118 which can then provide real-time feedback to the user 105 through the cognitive system 100 based upon the communication input 113 and/or can assist the user 105 to the appropriate destination device 107.

However, for each communication input 113 received by the cognitive device 101 having a phrase 127 not included in the database 115, the phrase 127 can be considered as an otherwise previously unidentified intent associated with a general intent 130. That is, the user 105 may provide a unique input for a general intent 130 which is initially unrecognized by the cognitive device 101. Accordingly, in one arrangement, the cognitive device 101 can be configured to store the communication 113 and phrase 127 in a repository device 270 for later analysis.

In one arrangement, the repository device 270 is disposed in electrical communication with the agent device 118. During operation, an agent 117 can review the communications 113 and phrases 127 stored in the repository device 270 and provide an intent assignment to the phrases 127 where the intent assignment is associated with a general intent 130 stored by the database 115. For example, assume the enterprise is a meat market and that most users 105 accessing the enterprise provide a communication input 113 that includes the phrase "meat." Further assume that a minority of users 105 access the enterprise and provide a communication input 113 that includes the phrase "hot dog" which is not included in the database 115. When the cognitive device 101 stores these communication inputs 113 to the repository device 270, the agent 117 can access the repository device 270 via the agent device 118, can manually identify the phrase 127 "hot dog", can assign an intent to the phrase, such as "meat," and can add the phrase 131 to the corresponding and associated general intent stored by the database 115. As such, agent 117 can identify and fill gaps in the database 115 which can go otherwise undetected, thereby adding to the robustness of the cognitive system 100.

As provided above, the agent 117 can access the cognitive device 101 via the agent device 118 to add intent phrases 131 to the general intents 120 stored by the database 115. In one arrangement, the agent 117 can also access the cognitive device 101 via the agent device 118 to review the accuracy of the intent phrases 131 associated with each general intent 130 and to delete intent phrases 131 if the phrases 131 are inaccurate relative to a given general intent 130.

In the case where the agent device 118 identifies an erroneous intent phrase 131 associated with the general intent 130 and removes the intent phrase 131 from the database 115, the number of intent phrases 131 associated with that particular general intent 130 can fall below the minimum number of intent phrases 131 indicated by the specification identifier 116 of the performance specification 112. In one arrangement, if the agent device 118 removes a phrase 131 from the database 115, the cognitive training device 102 is configured to reanalyze the database 115 to ensure that it includes the minimum number of intent phrases 131 provided by the specification identifier 116.

Figure 7:
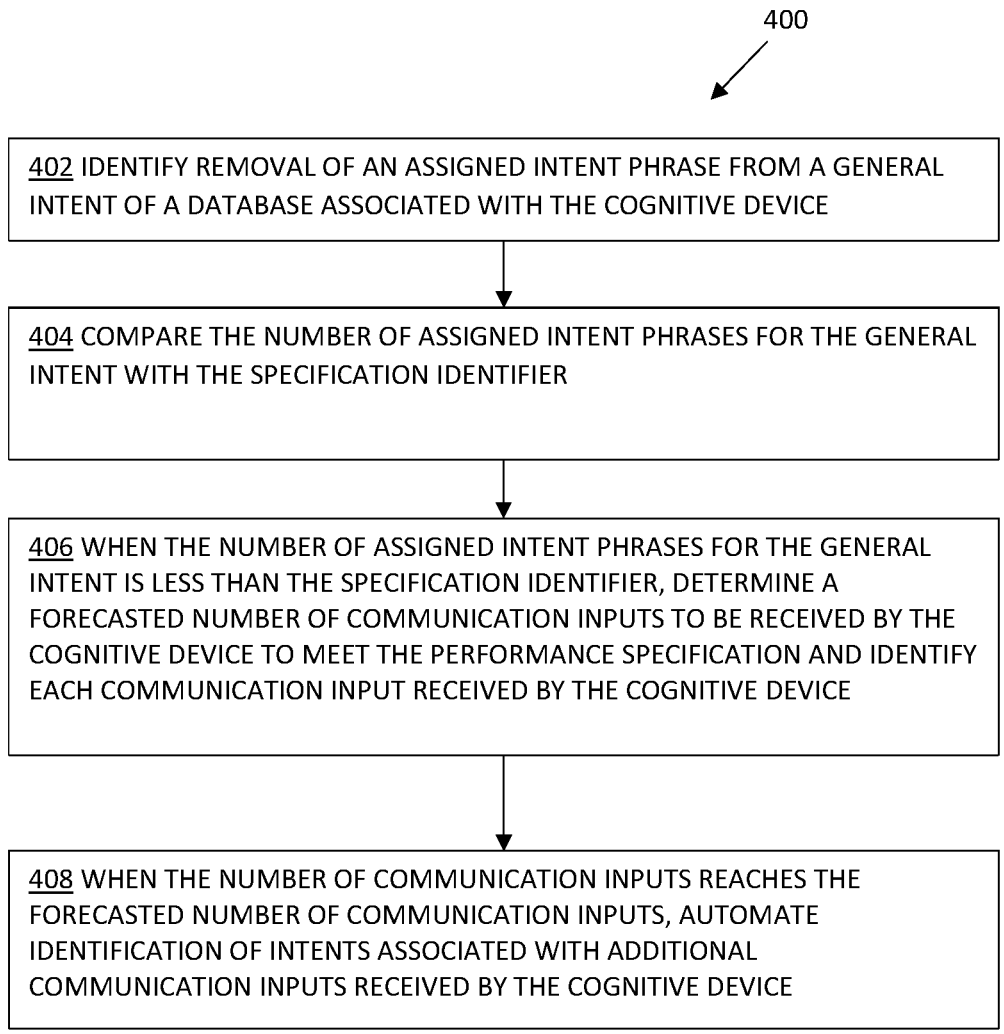
FIG. 7 illustrates a flowchart, according to one arrangement.

For example with reference to the flowchart 400 provided in FIG. 7, in element 402 the cognitive training device 102 is configured to identifies the removal of an assigned intent phrase 131 from a general intent 130 of the database associated with the cognitive device 101. For example, in response to the deletion of a phrase 131 from the database 115, the cognitive device 101 can generate and transmit a notification signal (not shown) to the cognitive training device 102. In element 404, the cognitive training device 102 is configured to compare the number of assigned intent phrases 131 for the general intent 130 with the specification identifier 116. As provided in element 406, when the number of assigned intent phrases 131 for the general intent 130 is less than the specification identifier 116, the cognitive training device 102 is configured to determine a forecasted number 125 of communication inputs 113 to be received by the cognitive device 101 to meet the performance specification 112 and to identify each communication input 113 received by the cognitive device 101. In element 408, when the number of communication inputs 113 reaches the forecasted number 125 of communication inputs 125, the cognitive training device 102 is configured to automate identification of intents associated with additional communication inputs 113 received by the cognitive device 101.

While various embodiments of the innovation have been particularly shown and described, it will be understood by those skilled in the art that various changes in form and details may be made therein without departing from the spirit and scope of the innovation as defined by the appended claims.

What is claimed is:

1. A method of training a cognitive system, comprising:
identifying, by a cognitive training device, a performance specification associated with a cognitive device;
determining, by the cognitive training device, a forecasted number of communication inputs to be received by the cognitive device to meet the performance specification;
identifying, by the cognitive training device, each communication input received by the cognitive device; and
when the number of communication inputs reaches the forecasted number of communication inputs, automating, by the cognitive training device, identification of intents associated with additional communication inputs received by the cognitive device.

2. The method of claim 1, wherein identifying the performance specification comprises identifying, by the cognitive training device, an intent identifier which provides a number of general intents recognizable by the cognitive device.

3. The method of claim 2, wherein identifying the performance specification further comprises identifying, by the cognitive training device, a specification identifier which provides a number of unique phrases associated with each general intent.

4. The method of claim 3, wherein determining the forecasted number of communication inputs comprises determining, by the cognitive training device, the forecasted number of communication inputs according to a forecasting relationship: $(n \times 3)(\ln(n \times 3) + \gamma) + 0.5$ where n=intent identifier*specification identifier and y is the Euler-Mascheroni constant.

5. The method of claim 4, wherein when the number of communication inputs reaches the forecasted number of communication inputs, prior to automating the identification of intents associated with additional communication inputs received by the cognitive device:
reviewing, by the cognitive training device, a database associated with the cognitive device for a number of assigned intent phrases for each general intent;
comparing, by the cognitive training device, the number of assigned intent phrases for each general intent with the specification identifier;
when the number of assigned intent phrases for any general intent is less than the specification identifier:
adjusting, by the cognitive training device, a value of the specification identifier of the forecasting relationship,
generating, by the cognitive training device, a revised forecasted number of communication inputs according to the forecasting relationship, and
when the number of communication inputs reaches the revised forecasted number of communication inputs, repeating the steps of reviewing the database associated with the cognitive device for the number of assigned intent phrases for each general intent and comparing the number of assigned intent phrases for each general intent with the specification identifier.

6. The method of claim 3, comprising:
identifying, by the cognitive training device, removal of an assigned intent phrase from a general intent of a database associated with the cognitive device;
comparing, by the cognitive training device, the number of assigned intent phrases for the general intent with the specification identifier; and
when the number of assigned intent phrases for the general intent is less than the specification identifier:

determining, by the cognitive training device, a forecasted number of communication inputs to be received by the cognitive device to meet the performance specification, identifying, by the cognitive training device, each communication input received by the cognitive device, and when the number of communication inputs reaches the forecasted number of communication inputs, automating, by the cognitive training device, identification of intents associated with additional communication inputs received by the cognitive device.

7. The method of claim 1, further comprising determining, by the cognitive training device, a forecasted number of cognitive system experts to process the incoming communications.

8. The method of claim 7, wherein determining the forecasted number of cognitive system workers comprises comprising determining, by the cognitive training device, the forecasted number of cognitive system workers to process the incoming communications according to the forecasted worker relationship:

$$\frac{\frac{Z^2 \cdot p(1-p)}{e^2}}{1 + \left(\frac{Z^2 \cdot p(1-p)}{e^2 N}\right)}$$

where p=sample portion; Z=critical value; e=margin of error; and N=population.

9. The method of claim 1, further comprising:
receiving, by the cognitive training device, a change criterion associated with the cognitive device; and
in response to the change criterion:
identifying, by the cognitive training device, a performance specification associated with the cognitive device and related to the change criterion,
determining, by the cognitive training device, a forecasted number of communication inputs related to the change criterion to be received by the cognitive device to meet the performance specification associated with the cognitive device and,
identifying, by the cognitive training device, each communication input received by the cognitive device, and
when the number of communication inputs reaches the forecasted number of communication inputs related to the change criterion, automating, by the cognitive training device, identification of intents associated with additional communication inputs received by the cognitive device.

10. A cognitive training device, comprising:
a controller having a processor and a memory, the controller configured to:
identify a performance specification associated with a cognitive device;
determine a forecasted number of communication inputs to be received by the cognitive device to meet the performance specification;
identify each communication input received by the cognitive device; and
when the number of communication inputs reaches the forecasted number of communication inputs, automate identification of intents associated with additional communication inputs received by the cognitive device.

11. The cognitive training device of claim 10, wherein when identifying the performance specification, the controller is configured to identify an intent identifier which provides a number of general intents recognizable by the cognitive device.

12. The cognitive training device of claim 11, wherein when identifying the performance specification, the controller is further configured to identify a specification identifier which provides a number of unique phrases associated with each general intent.

13. The cognitive training device of claim 12, wherein when determining the forecasted number of communication inputs, the controller is configured to determine the forecasted number of communication inputs according to a forecasting relationship: $(n \times 3)(\ln(n \times 3) + \gamma) + 0.5$ where n=intent identifier*specification identifier and y is the Euler-Mascheroni constant.

14. The cognitive training device of claim 13, wherein when the number of communication inputs reaches the forecasted number of communication inputs, prior to automating the identification of intents associated with additional communication inputs received by the cognitive device, the controller is configured to:
review a database associated with the cognitive device for a number of assigned intent phrases for each general intent;
compare the number of assigned intent phrases for each general intent with the specification identifier;
when the number of assigned intent phrases for any general intent is less than the specification identifier:
adjust a value of the specification identifier of the forecasting relationship,
generate a revised forecasted number of communication inputs according to the forecasting relationship, and
when the number of communication inputs reaches the revised forecasted number of communication inputs, repeat the steps of reviewing the database associated with the cognitive device for the number of assigned intent phrases for each general intent and comparing the number of assigned intent phrases for each general intent with the specification identifier.

15. The cognitive training device of claim 12, wherein the controller is configured to:
identify removal of an assigned intent phrase from a general intent of a database associated with the cognitive device;
compare the number of assigned intent phrases for the general intent with the specification identifier; and
when the number of assigned intent phrases for the general intent is less than the specification identifier:
determine a forecasted number of communication inputs to be received by the cognitive device to meet the performance specification,
identify each communication input received by the cognitive device, and
when the number of communication inputs reaches the forecasted number of communication inputs, automate identification of intents associated with additional communication inputs received by the cognitive device.

16. The cognitive training device of claim 10, further comprising determining, by the cognitive training device, a forecasted number of cognitive system experts to process the incoming communications.

17. The cognitive training device of claim 16, wherein when determining the forecasted number of cognitive system workers, the controller is configured to determine the forecasted number of cognitive system workers to process the incoming communications according to the forecasted worker relationship:

$$\frac{\frac{Z^2 \cdot p(1-p)}{e^2}}{1+\left(\frac{Z^2 \cdot p(1-p)}{e^2 N}\right)}$$

where p=sample portion; Z=critical value; e=margin of error; and N=population.

18. The cognitive training device of claim 10, wherein the controller is further configured to:
receive a change criterion associated with the cognitive device; and
in response to receiving the change criterion:
identify a performance specification associated with the cognitive device and related to the change criterion,
determine a forecasted number of communication inputs related to the change criterion to be received by the cognitive device to meet the performance specification associated with the cognitive device and,
identify each communication input received by the cognitive device, and
when the number of communication inputs reaches the forecasted number of communication inputs related to the change criterion, automate identification of intents associated with additional communication inputs received by the cognitive device.

19. A cognitive system comprising:
a cognitive device having a database;
a cognitive training device, disposed in electrical communication with the cognitive device, the cognitive device configured to:
identify a performance specification associated with a cognitive device;
determine a forecasted number of communication inputs to be received by the cognitive device to meet the performance specification;
identify each communication input received by the cognitive device; and
when the number of communication inputs reaches the forecasted number of communication inputs, automate identification of intents associated with additional communication inputs received by the cognitive device.

20. The system of claim 19, further comprising:
a repository device disposed in electrical communication with the cognitive device, the repository device configured to store a communication input received from the cognitive device, the communication input having a phrase absent from the database; and
an agent device disposed in electrical communication with the repository device and the cognitive device, the agent device configured to receive an intent assignment associated with the phrase of the communication input and to store the phrase in the database with a general intent corresponding to the intent assignment.

* * * * *